(12) United States Patent
Edel et al.

(10) Patent No.: US 10,392,575 B2
(45) Date of Patent: Aug. 27, 2019

(54) LIGNITE DRYING WITH CLOSED LOOP HEAT PUMP

(71) Applicant: ALSTOM Technology Ltd, Baden (CH)

(72) Inventors: Thomas Edel, Colmar (FR); Frederic Geiger, Giromagny (FR); Thierry Pourchot, Naves Parmclan (FR); Didier Wantz, Bavilliers (FR)

(73) Assignee: General Electric Company, Schenectady, NY (US)

( * ) Notice: Subject to any disclaimer, the term of this patent is extended or adjusted under 35 U.S.C. 154(b) by 476 days.

(21) Appl. No.: 15/162,904

(22) Filed: May 24, 2016

(65) Prior Publication Data

US 2016/0348023 A1    Dec. 1, 2016

(30) Foreign Application Priority Data

May 26, 2015  (EP) ..................... 15290138

(51) Int. Cl.
*C10F 5/00* (2006.01)
*C10L 5/04* (2006.01)
(Continued)

(52) U.S. Cl.
CPC .................. *C10L 9/08* (2013.01); *C10F 5/00* (2013.01); *C10L 5/04* (2013.01); *F23K 1/04* (2013.01);
(Continued)

(58) Field of Classification Search
CPC ........ F26B 23/001; F26B 3/20; F26B 23/005; F26B 11/04; F26B 11/028; F26B 3/084;
(Continued)

(56) References Cited

U.S. PATENT DOCUMENTS

| 4,291,539 A | 9/1981 | Potter |
| 4,601,113 A | 7/1986 | Draper et al. |

(Continued)

FOREIGN PATENT DOCUMENTS

| AU | 1404783 A | 8/1983 |
| CN | 101881191 A | 11/2010 |

(Continued)

OTHER PUBLICATIONS

Rupprecht, T., and Fielenbach, C., "Efficiency and Flexibility—Techno-Economical Challenges for Pre-Dried Lignite Fired Power Plants," Power-Gen Europe, Milan, Italy, pp. 1-19 (Jun. 7-9, 2011).

(Continued)

*Primary Examiner* — Jessica Yuen
(74) *Attorney, Agent, or Firm* — James W. Pemrick; Frank A. Landgraff

(57) ABSTRACT

The invention relates to a dryer system for drying lignite coal used in a power plant. The system comprises a dryer and a closed loop heat pump circuit that is configured and arranged to provide heat energy to the dryer. The closed loop heat pump circuit includes a working fluid, a dryer heat exchanger, an expansion device fluidly connected and downstream of the dryer heat exchanger, arranged to enable heat energy transfer from the vapor of the second outlet line to the first working fluid and a compressor for compressing the working fluid.

8 Claims, 3 Drawing Sheets

(51) Int. Cl.
*C10L 9/08* (2006.01)
*F23K 1/04* (2006.01)
*F26B 3/20* (2006.01)
*F26B 11/02* (2006.01)
*F26B 11/04* (2006.01)
*F26B 23/00* (2006.01)
*F26B 3/084* (2006.01)

(52) U.S. Cl.
CPC .............. *F26B 3/20* (2013.01); *F26B 23/001* (2013.01); *F26B 23/005* (2013.01); *C10L 2290/06* (2013.01); *C10L 2290/08* (2013.01); *C10L 2290/10* (2013.01); *C10L 2290/46* (2013.01); *C10L 2290/48* (2013.01); *F23K 2201/20* (2013.01); *F23K 2900/01041* (2013.01); *F26B 3/084* (2013.01); *F26B 11/028* (2013.01); *F26B 11/04* (2013.01); *Y02B 30/52* (2013.01); *Y02P 70/405* (2015.11)

(58) Field of Classification Search
CPC .......... C10L 9/08; C10L 5/04; C10L 2290/48; C10L 2290/06; C10L 2290/10; C10L 2290/08; C10L 2290/46; C10F 5/00; F23K 1/04; F23K 2201/20; F23K 2900/01041; Y02P 70/405; Y02B 30/52
See application file for complete search history.

(56) References Cited

U.S. PATENT DOCUMENTS

| | | | |
|---|---|---|---|
| 4,601,115 A | 7/1986 | Draper et al. | |
| 5,353,517 A | 10/1994 | Weiss | |
| 6,148,599 A | 11/2000 | McIntosh et al. | |
| 8,661,821 B2 | 3/2014 | Zhao et al. | |
| 2010/0212320 A1 | 8/2010 | Block et al. | |
| 2011/0214427 A1 | 9/2011 | Zhao et al. | |
| 2012/0055158 A1 | 3/2012 | Berger et al. | |
| 2014/0260363 A1* | 9/2014 | Bush | F24F 1/06 62/81 |

FOREIGN PATENT DOCUMENTS

| | | |
|---|---|---|
| CN | 201697441 U | 1/2011 |
| CN | 102353237 A | 2/2012 |
| CN | 103453752 A | 12/2013 |
| CN | 102759259 B | 6/2014 |
| CN | 102758657 B | 12/2014 |
| CN | 204041130 U | 12/2014 |
| DE | 4115781 C2 | 9/1994 |
| DE | 196 12 186 A1 | 10/1997 |
| DE | 195 18 644 C2 | 4/1998 |
| DE | 19512015 C2 | 7/1998 |
| DE | 19601931 C2 | 9/2000 |
| DE | 10319477 B4 | 11/2006 |
| DE | 102007023336 A1 | 11/2008 |
| DE | 102009019334 A1 | 11/2010 |
| DE | 102009035062 A1 | 2/2011 |
| EP | 576053 B1 | 1/1996 |
| EP | 2 412 943 A2 | 2/2012 |
| EP | 2423465 A2 | 2/2012 |
| EP | 2 436 978 A1 | 4/2012 |
| EP | 2 873 934 A1 | 5/2012 |
| FR | 485639 A | 1/1918 |
| FR | 2 984 400 A1 | 6/2013 |
| JP | H06-146812 A | 5/1994 |
| WO | 2011/033559 A1 | 3/2011 |
| WO | 2012/005164 A1 | 1/2012 |

OTHER PUBLICATIONS

Extended European Search Report and Opinion issued in connection with related EP Application No. 15290139.3 dated Nov. 18, 2015.
Extended European Search Report and Opinion issued in connection with related EP Application No. 15290140.1 dated Nov. 24, 2015.
Extended European Search Report and Opinion issued in connection with related EP Application No. 15290141.9 dated Dec. 2, 2015.
Extended European Search Report and Opinion issued in connection with related EP Application No. 16169514.3 dated Oct. 5, 2016.
Extended European Search Report and Opinion issued in connection with related EP Application No. 16169295.9 dated Nov. 21, 2016.

* cited by examiner

LIGNITE DRYING WITH CLOSED LOOP HEAT PUMP

CROSS-REFERENCE TO RELATED APPLICATIONS

This application claims priority to European Patent Application No. 15290138.5 filed May 26, 2015, the contents of which are hereby incorporated in its entirety

TECHNICAL FIELD

The present disclosure relates generally to the thermal Integration of a lignite drying process within a coal power plant with or without CO2 capture, and more specifically to the recovery and reuse of thermal energy in lignite drying vapour back into the drying process.

BACKGROUND

The general principle of lignite drying in a lignite fired plant is well known and involves using either hot flue gas extraction and/or steam extraction from the water/steam cycle to supply thermal energy to the lignite drying systems comprising beater mills, rotary drum dryer or fluidized bed dryers.

So called beater mills technology uses hot flue gas extracted from the top of the furnace and then recirculates this extraction in the mill in order to evaporate the high amount of lignite moisture, which can be up to 60% of lignite content for "B" grade lignites. Drying is an important step as it enables pulverization of lignite necessary for combustion. A problem of such systems is that it results in a very high efficiency penalty due to the need for very high enthalpy heat from the boiler for the drying process. The high heat requirement results in high boiler losses due to the loss of residual sensible heat from the large flue gas flow and zero recovery of the latent heat of removed moisture from the lignite.

To at least mitigate this problem lignite pre-drying techniques have been developed using medium or low enthalpy heat to achieve partial or high level of lignite pre-drying before pulverization. The techniques can provide efficiency gains of up to 3% points without heat recovery of evaporation vapour of lignite moisture or 5% point with heat recovery of evaporation vapour of lignite moisture.

German patent DE 195 18 644 C2 provides a solution utilising so called Waste Heat Utilisation (WTA) type 1 and 2 processes in order to pre-drying lignite.

The WTA type I process includes a direct heat pump loop with a vapour compressor that utilises the moisture vapour as drying heat. After de-dusting to remove lignite particles, the vapour is compressed with a vapour-compressor and sent in the heat exchanger of the dryer. Remaining heat of the drying vapour condensates exiting the dryer heat exchanger can be integrated in the low pressure condensate heaters of a water steam cycle of a typical steam power plant. The process does not require any steam extraction from the water/steam cycle and may be operated independently from the power plant. While it maximizes recycle of the drying vapour heat to evaporate the lignite moisture the process can have the disadvantage that as "dirty" drying vapour is used for compression, the required compressor may be large and expensive and further may be fouled and/or eroded and/or corroded if no advanced cleaning of dirty vapour is carried out.

The alternate WTA type 2 process includes a steam extraction from water/steam cycle of a typical steam power plant for the drying heat source. This process is much simpler and cheaper than WTA type 1, however, optimisation of the location of steam extraction varies with plant load and as such may lead to lower net plant efficiency that the type 1 system if no or limited heat recovery from drying vapour occurs. A further problem can be that the maximization of the heat recovery from drying vapours for plant performance improvement, together with the cleaning of this vapour, for environmental reasons, may require cleaning of the dirty vapour by condensation in order to avoid release of pollutants which would otherwise occur if released directly in the atmosphere in the vapour state.

SUMMARY

A dryer system for drying lignite coal for combustion in a boiler is disclosed. The system can provide thermal recovery of thermal energy used to dry the lignite.

It attempts to address this problem by means of the subject matters of the independent claims. Advantageous embodiments are given in the dependent claims.

In an aspect a drying system for drying lignite coal for use in a power plant is provided. The system comprises a dryer adapted to dry lignite coal and a closed loop heat pump circuit that is configured and arranged to provide heat energy to the dryer The dryer has an inlet line for direction lignite coal into the dryer, a first outlet line for removing dried lignite coal from the dryer, and a second outlet line for removing vapour from the dryer.

One general aspect includes a dryer system for drying lignite coal for use in a power plant. The system comprises a dryer adapted to dry lignite coal and a closed loop heat pump. The dryer includes an inlet line for direction lignite coal into the dryer, a first outlet line for removing dried lignite coal from the dryer, and a second outlet line for removing vapour from the dryer. The closed loop heat pump circuit is configured and arranged to provide heat energy to the dryer and includes a first working fluid, a dryer heat exchanger in the dryer, an expansion device fluidly connected and downstream of the heat exchanger downstream, an evaporator heat exchanger fluidly connected to and downstream of the expansion device and further connected to the second outline line so as to enable heat energy transfer from the vapour of the second outlet line to the working fluid, and a compressor for compression of the first working fluid, fluidly connected to and downstream of the evaporator heat exchange and to an upstream end of the dryer heat exchanger.

The design of an indirect heat pump process to supply drying heat to the lignite dryer from the drying vapour exiting the drier in order to avoid any risk of fouling, corrosion or erosion of the heat pump compressor which could occur in case of direct compression of dirty drying vapour.

Further aspects may include one or more of the following features. The dryer is a fluidised bed dryer. The dryer system is a steam heated rotary tube dryer. The expansion device is a valve. The expansion device is a turbine. The dryer system further comprises a separation tank that is fluidly located between the expansion device and the compressor. The separation tank having a vapour line extending from the separation tank to a point fluidly upstream of the compressor so as to bypass the evaporator heat exchanger as well as a liquid line extending from the separator to the evaporator heat exchanger. A closed loop lignite preheating circuit for preheating the lignite coal before entering the dryer. The closed loop lignite preheating circuit comprising a second working fluid, a heat recovery heat exchanger connected to the second outlet line so as to enable thermal energy exchange from the vapour from the dryer to the second working fluid, and a pre-heater connected to the inlet line so as to enable preheating of the lignite coal before entry into the dryer. A pre-heater connected to the inlet line so as to enable preheating of the lignite coal before entry into the dryer using heat energy from the second working fluid.

Other aspects and advantages of the present disclosure will become apparent from the following description, taken in connection with the accompanying drawings which by way of example illustrate exemplary embodiments of the present invention

BRIEF DESCRIPTION OF THE DRAWINGS

By way of example, an embodiment of the present disclosure is described more fully hereinafter with reference to the accompanying drawings, in which.

DETAILED DESCRIPTION

Figure 1:
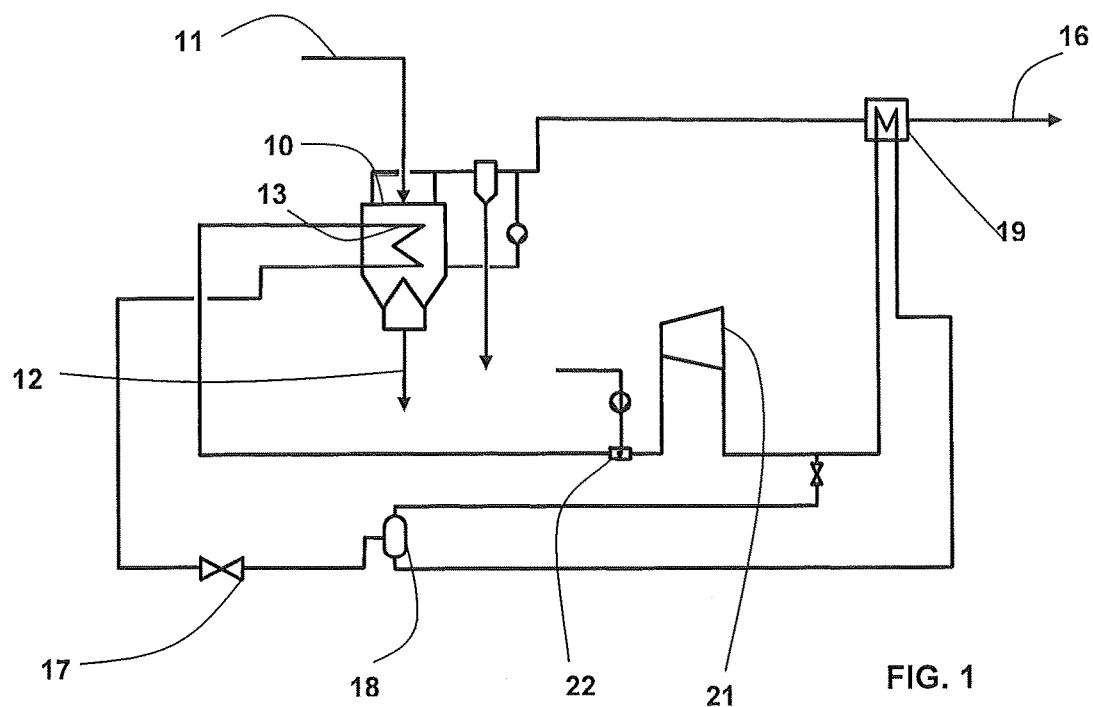
FIG. 1 is a schematic of a lignite dryer with a heat pump circuit according to an embodiment of the disclosure.

Exemplary embodiments of the present disclosure are now described with references to the drawings, wherein like reference numerals are used to refer to like elements throughout. In the following description, for purposes of explanation, numerous specific details are set forth to provide a thorough understanding of the disclosure. However, the present disclosure may be practiced without these specific details, and is not limited to the exemplary embodiment disclosed herein.

FIG. 1 shows an exemplary embodiment of a drying system to dry pulverised lignite utilising an indirect heat pump process. In its simplest form the system comprises a dryer 10 and a closed loop heat pump circuit for heating the dryer 10.

The dryer 10 includes an inlet line 11 for directing lignite into the dryer 10, a vapour outlet line 16 for exhausting moisture laden gas from the dryer and a solids outlet line 12 for discharging dried lignite for use in a combustor of a lignite fired boiler. The dryer 10 can be a steam fluidized bed dryer or a steam heated rotary tube dryer.

The closed loop heat pump circuit comprises a working fluid that circulates between dryer heat exchanger 13 located in the dryer 10, an expansion device 17, an evaporator heat exchanger 19 and a compressor 21.

In an exemplary embodiment shown in FIG. 1 drying vapour produced in the dry vapour is de-dusted in a particle removal system, such as a cyclone, electrostatic precipitator, fabric filter or any combination of a cyclone, electrostatic precipitator, fabric filter cycle, where lignite particles are removed and returned to the dryer 10 or to solids outline line 12.

In an exemplary embodiment, applicable to an atmospheric or low pressure dryer, the closed loop heat pump circuit provides 3-4 bar(a) low pressure low superheat steam to the dryer heat exchanger 13 to heat and dry wet lignite in the dryer 10. Steam is condensed within the dryer 10 in the dryer heat exchanger 13 causing evaporation of wet lignite moisture, thus producing the drying vapour that is exhausted from the dryer 10 by a vapour outlet line 16. Low pressure condensate in the closed loop heat pump circuit exits the dryer heat exchanger 13 and is expanded to very low pressure, for example 0.5 bara, by an expanding device 17, resulting in partial evaporation of the condensate. In one exemplary embodiment the expansion device 17 is a throttling valve. In another exemplary embodiment the expansion device 17 is a turbine.

In an exemplary embodiment, working fluid vapour and liquid from the expansion device 17 are separated in separation tank 18 wherein the liquid component is directed through the evaporator heat exchanger 19 while the vapour component bypasses the evaporator heat exchanger 19 and is mixed with working fluid vapour from the evaporator heat exchanger 19 prior to the next unit operation of the closed loop heat pump circuit. Although the steam-water separation step may be optional from a thermodynamic and process standpoint, it can be advantageous to avoid two phase flow and in addition heat transfer rate in the evaporator heat exchanger 19 may be improved if the evaporator heat exchanger 19 is fed with liquid phase working fluid only.

The expanded working fluid is then evaporated in an evaporator heat exchanger 19 against vapour outlet line 16. This results in vaporisation of the liquid component of the working fluid and at least partial condensation of the vapour in the vapour outlet line 16.

Working fluid vapour is then further compressed in a compressor 21 and then returned to the dryer heat exchanger 13.

In an exemplary embodiment, prior to returning to the dryer heat exchanger 13, the temperature of the working fluid is adjusted by a de-superheater 22, such as a water spray device.

An exemplary embodiment shown in FIG. 2-5, further comprises pre-heating of lignite before it enters the dryer 10.

Figure 2:
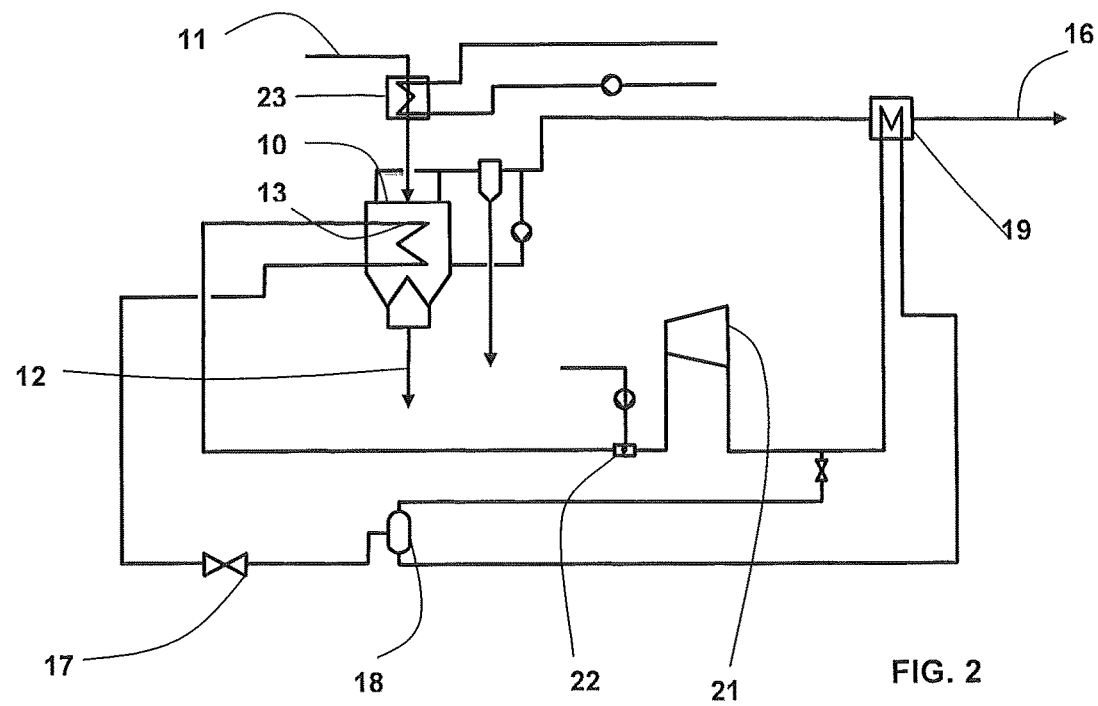
FIG. 2 is a schematic of the lignite dryer of FIG. 1 further including preheating of lignite feed to the dryer.

In an exemplary embodiment shown in FIG. 2 a pre-heater 23 is located on the dryer inlet line 11. The energy source is steam extracted from a low pressure steam from a water steam power cycle, for example extractions from a low pressure turbine module of a not shown steam turbine power train wherein condensate from the pre-heater 23 is returned to a condensate pre-heat system of the water/steam power cycle.

Figure 3:
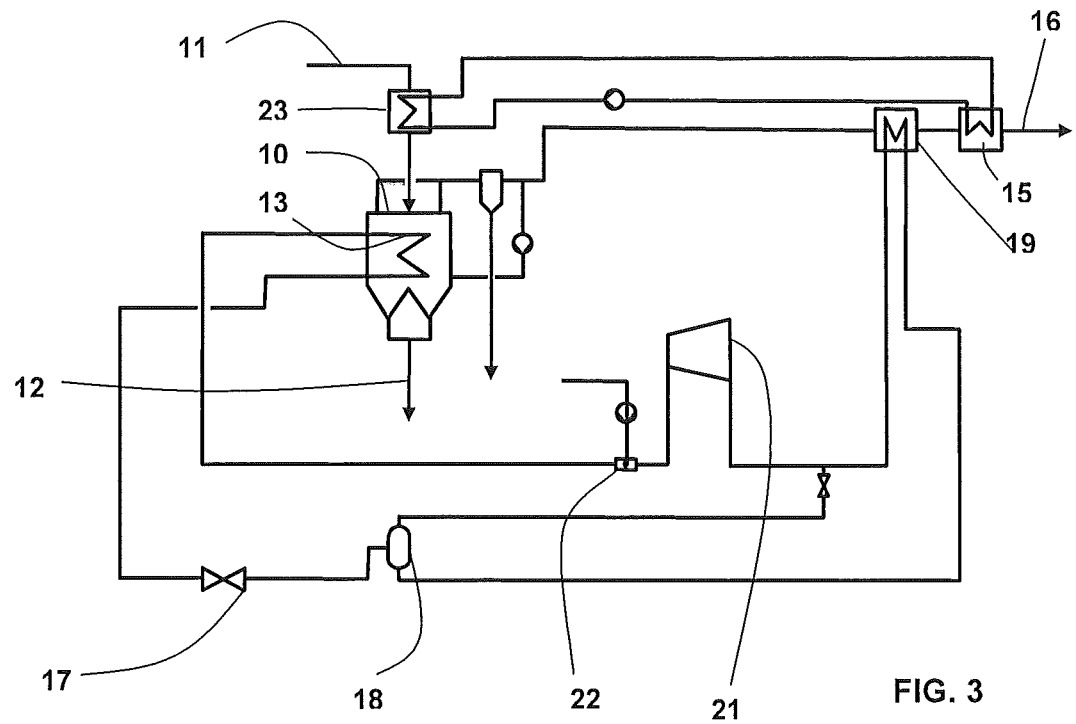
FIG. 3 is a schematic of the lignite dryer of FIG. 1 further including preheating of lignite feed to the dryer using thermal energy from a vapour exhaust of the dryer.

In an exemplary embodiment shown in FIG. 3 a pre-heater 23 is located on the dryer inlet line 11. The energy source for the pre-heater 23 is a heat recover exchanger 15 located in the vapour outlet line 16 downstream of the evaporator heat exchanger 19. The preheating of wet lignite prior to feeding into the dryer 10 allow further utilisation of lower grade thermal energy in the vapour outlet line 16 after vaporisation of working fluid in the heat pump cycle. This can result in an additional 10% recovery of heat energy from the vapour outlet line 16.

Figure 4:
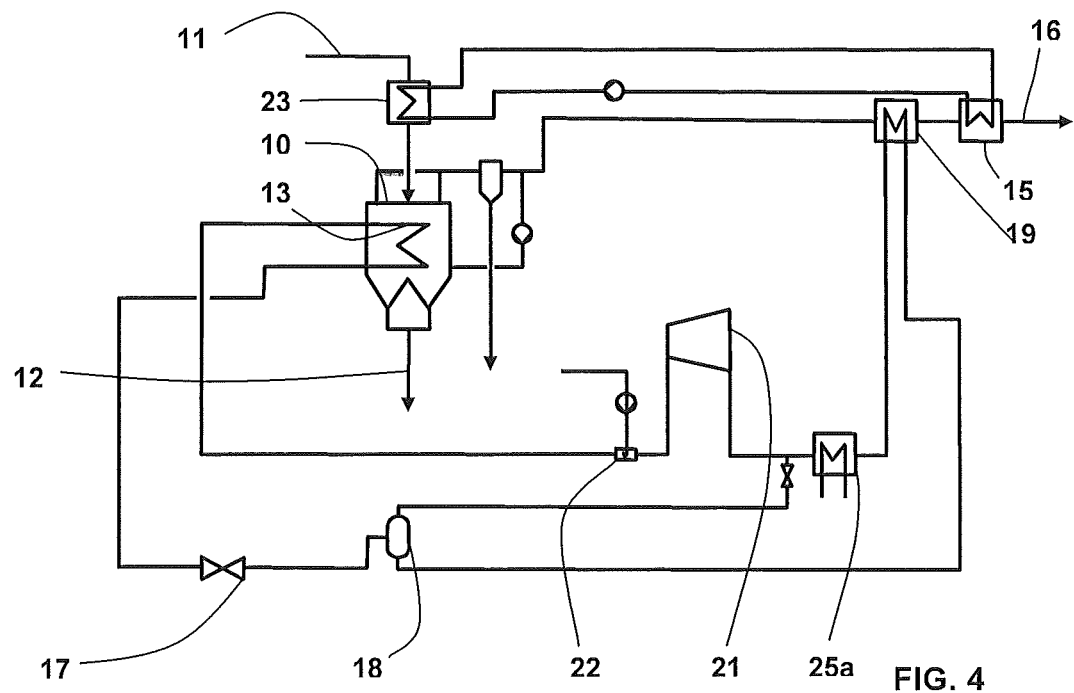
FIG. 4 is a schematic of the lignite dryer of FIG. 1 further including preheating of lignite feed to the dryer using thermal energy from a vapour exhaust of the dryer as well as an additional energy input source in the feed line to a compressor of the heat pump circuit.

An exemplary embodiment shown in FIG. 4 includes post-heating of the working fluid drying steam upstream of the compressor 21 using steam, for example low pressure steam extracted from a low pressure steam turbine of a water steam power cycle. The heating is achieved with a heater 25a fluidly located between the compressor 21 and the evaporator heat exchanger 19. In an exemplary embodiment having a separation tank, the heater 25a is fluidly located between the point where vapour from the separation tank 18 re-joins the main working fluid flow and the evaporator heat exchanger 19. In a not shown exemplary embodiment condensate from the heater 25a is returned to the condensate system of a water steam power cycle.

Figure 5:
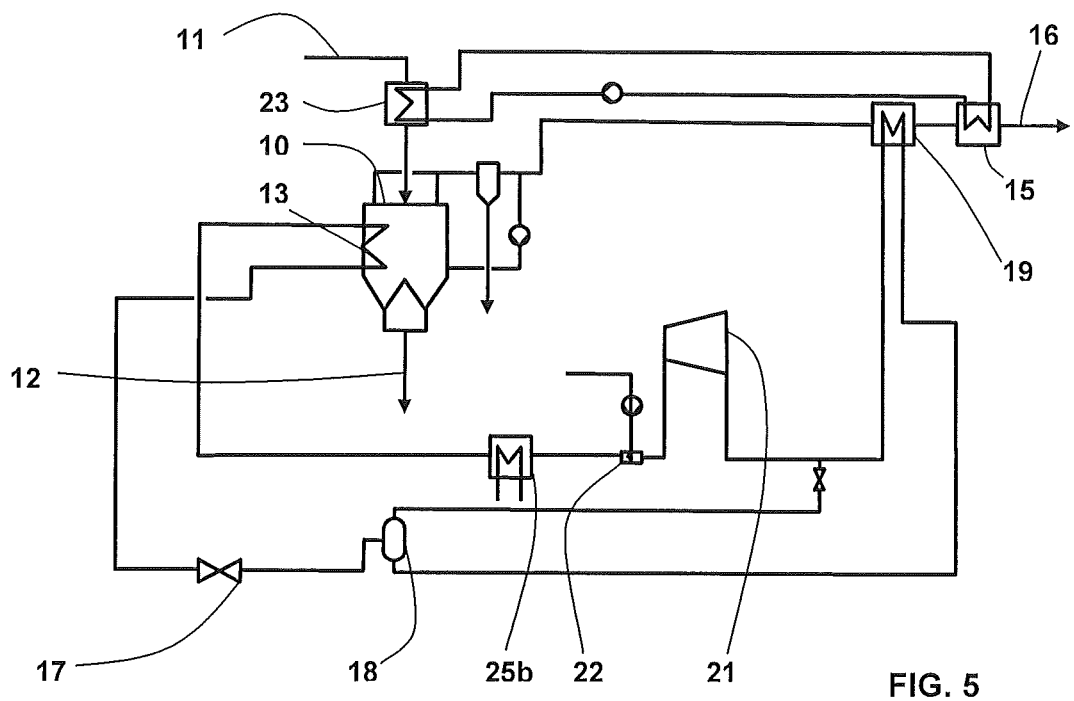
FIG. 5 is a schematic of the lignite dryer of FIG. 1 further including preheating of lignite feed to the dryer using thermal energy from a vapour exhaust of the dryer as well, as an additional energy input source between the compressor and the lignite dryer.

An exemplary embodiment shown in FIG. 5 includes post-heating of the working fluid downstream of the compressor 21 using steam, for example intermediate pressure steam extracted from an intermediate pressure steam turbine of a water steam power cycle. The heating is achieved with a heater 25b fluidly located between the compressor 21 and the dryer heat exchanger 13. In an exemplary embodiment having a de-superheater 22 the heater 25b is fluidly located between the de-superheater 22 and the compressor 21. In a not shown exemplary embodiment condensate from the heater 25b is returned to the condensate system of a water steam power cycle.

Although the disclosure has been herein shown and described in what is conceived to be the most practical exemplary embodiment, the present disclosure can be embodied in other specific forms. The presently disclosed embodiments are therefore considered in all respects to be illustrative and not restricted. The scope of the disclosure is indicated by the appended claims rather that the foregoing description and all changes that come within the meaning and range and equivalences thereof are intended to be embraced therein.

The invention claimed is:

1. A dryer system for drying lignite coal for use in a power plant, the system comprising:
   a dryer, adapted to dry lignite coal, having:
      an inlet line for direction lignite coal into the dryer;
      a first outlet line for removing dried lignite coal from the dryer; and
      a second outlet line for removing vapour from the dryer,
   a closed loop heat pump circuit, configured and arranged to provide heat energy to the dryer, comprising:
      a first working fluid;
   a dryer heat exchanger in the dryer;
      an expansion device fluidly connected and downstream of the dryer heat exchanger;
      an evaporator heat exchanger fluidly connected to and downstream of the expansion device and further connected to the second outline line so as to enable heat energy transfer from the vapour of the second outlet line to the first working fluid; and
      a compressor, fluidly connected to and downstream of the evaporator heat exchanger and at an upstream end of the dryer heat exchanger, for compressing the first working fluid; and
   a pre-heater connected to the inlet line so as to enable preheating of the lignite coal before entry into the dryer, wherein the pre-heater is connected to the second outlet line downstream of the evaporator heat exchanger so as to enable the use of a remaining heat of the vapour and/or vapour condensate exiting the evaporator heat exchanger thereby preheating of the lignite coal before entry into the dryer.

2. The dryer system of claim 1, wherein the dryer is a fluidised bed dryer.

3. The dryer system of claim 1, wherein the dryer is a steam heated rotary tube dryer.

4. The dryer system of claim 1, wherein the expansion device is a valve.

5. The dryer system of claim 1, wherein the expansion device is a turbine.

6. The dryer system of claim 1, further comprising a separation tank, fluidly located between the expansion device and the compressor, including:
   a vapour line extending from the separation tank to a point fluidly upstream of the compressor so as to bypass the evaporator heat exchanger;
   a liquid line extending from the separator to the evaporator heat exchanger.

7. The dryer system of claim 1, further comprising a desuperheater fluidly located between the compressor and the dryer heat exchanger.

8. A dryer system for drying lignite coal for use in a power plant, the system comprising:
   a dryer, adapted to dry lignite coal, having:
      an inlet line for direction lignite coal into the dryer;
      a first outlet line for removing dried lignite coal from the dryer; and
      a second outlet line for removing vapour from the dryer,
   a closed loop heat pump circuit, configured and arranged to provide heat energy to the dryer, comprising:
      a first working fluid;
   a dryer heat exchanger in the dryer;
      an expansion device fluidly connected and downstream of the dryer heat exchanger;
      an evaporator heat exchanger fluidly connected to and downstream of the expansion device and further connected to the second outline line so as to enable heat energy transfer from the vapour of the second outlet line to the first working fluid;
      a compressor, fluidly connected to and downstream of the evaporator heat exchanger and at an upstream end of the dryer heat exchanger, for compressing the first working fluid; and
   a closed loop lignite preheating circuit for preheating the lignite coal before entering the dryer, the closed loop lignite preheating circuit comprising:
   a second working fluid;
   a heat recovery heat exchanger connected to the second outlet line so as to enable thermal energy exchange from the vapour from the dryer to the second working fluid; and
   a pre-heater connected to the inlet line so as to enable preheating of the lignite coal before entry into the dryer using heat energy from the second working fluid.

* * * * *